(12) United States Patent
Kurlancheek et al.

(10) Patent No.: US 8,562,444 B2
(45) Date of Patent: Oct. 22, 2013

(54) SHARING ITEMS BETWEEN MULTIPLE GAME PARTICIPANTS

(75) Inventors: Jesse David Kurlancheek, Cambridge, MA (US); Christine Trottier, Kensington, CA (US)

(73) Assignee: Zynga Inc., San Francisco, CA (US)

( * ) Notice: Subject to any disclaimer, the term of this patent is extended or adjusted under 35 U.S.C. 154(b) by 69 days.

(21) Appl. No.: 13/224,937

(22) Filed: Sep. 2, 2011

(65) Prior Publication Data

US 2013/0059663 A1    Mar. 7, 2013

(51) Int. Cl.
*A63F 13/00* (2006.01)

(52) U.S. Cl.
USPC ........ 463/42; 463/1; 463/29; 463/33; 463/39; 463/40; 463/41; 463/43

(58) Field of Classification Search
USPC ............... 463/1, 2, 6, 7–9, 39–43, 29, 32–33; 705/14.49, 14.5, 400, 44, 51, 17–19, 705/37–38
See application file for complete search history.

(56) References Cited

U.S. PATENT DOCUMENTS

| 2004/0193673 A1* | 9/2004 | Samji et al. ............. 709/200 |
| 2004/0266505 A1* | 12/2004 | Keam et al. .................. 463/1 |
| 2006/0154713 A1* | 7/2006 | Sunazuka et al. ............ 463/6 |

OTHER PUBLICATIONS

RuneScape, Jagex Games Studio, Mar. 17, 2004; http://en.wikipedia.org/wiki/RuneScape.*

* cited by examiner

*Primary Examiner* — Sunit Pandya
(74) *Attorney, Agent, or Firm* — Kenyon & Kenyon LLP

(57) ABSTRACT

Items may be transferred between participants in a multi-participant gaming application through an item sharing object. The item sharing object may be activated by a participant during game play. After activating the item sharing object, a state of the item sharing object may be determined. If the state indicates that a prior participant has left behind an item that is available, then the left behind item may be presented to the current participant activating the object. Alternatively, if no items are available, the processing device may present the current participant with a quest, the completion of which may result in the current participant leaving behind an item for a subsequent participant activating the item sharing object.

26 Claims, 4 Drawing Sheets

SHARING ITEMS BETWEEN MULTIPLE GAME PARTICIPANTS

BACKGROUND

In many computer and video games, participants may navigate game characters through game maps to explore environments, interact with other characters, discover items, or perform other tasks. As these participants play the game, their characters may acquire different items or rewards, some of which may be stored in an inventory. For example, characters may acquire points, health, weapons, tools, resources, or other items. Some of these acquired items may provide the character with an advantage during game play, such as a more powerful weapon to cause more damage, while others may be necessary to progress in the game, such as a key to open a door.

In single player games, a participant typically finds or receives an item, uses and/or stores the item in inventory, and then discards the item when it has been used up or is no longer as useful for the player. However, in social multiplayer games in which multiple people agree to play a game together, it may be desirable to provide rewards and opportunities for participants to share items amongst themselves to encourage cooperation and communication between participants as part of the game play.

There is a need for improved item sharing functionality in multi-participant gaming applications.

DETAILED DESCRIPTION

In an embodiment of the invention, items, such as points, health, weapons, tools, resources, or other game items, may be transferred between participants in a multi-participant gaming application through an item sharing object. The item sharing object may be activated by a participant during game play. This activation may occur, for example, when a participant selects, opens, reveals, navigates to, or otherwise interacts with the item sharing object or the gaming application in a predetermined manner. The activation may also vary for different participants and/or different instances of the gaming application. For example, different participants may have to navigate to different locations in the gaming application to activate the same item sharing object or each participant may have to navigate to a different location to activate the same item sharing object after each replay.

The item sharing object may store data about the object and data concerning items left by participants. The object data may include capacity, timing, and quest information. The data concerning items left by participants may include an identifier of each item left, an identifier of each participant leaving the item, and an identifier of each time each item was left.

After activating the item sharing object, one or more fields of the item sharing object may be checked to determine a state of the item sharing object. These states may be used to determine the actions available to participant activating the item sharing object. For example, if the state indicates that a prior participant has left behind an item that is available, then a processing device executing the gaming application may present the left behind item to the current participant activating the object so that the current participant may make use of the item. Alternatively, if no items are available, the processing device may present the current participant with a quest, the completion of which may result in the current participant leaving behind an item for a subsequent participant activating the item sharing object.

In other instances, a processing device may be used to enable participants to access items left behind by other participants if the activated item sharing object indicates that the items left behind are available. The processing device may also be used to enable a participant activating the item sharing object to leave an item in that participant's possession behind to share with another participant. If the participant chooses to leave the possessed item behind, the item sharing object may be modified to indicate that the item left behind is now available for the other participant's use.

Figure 1:
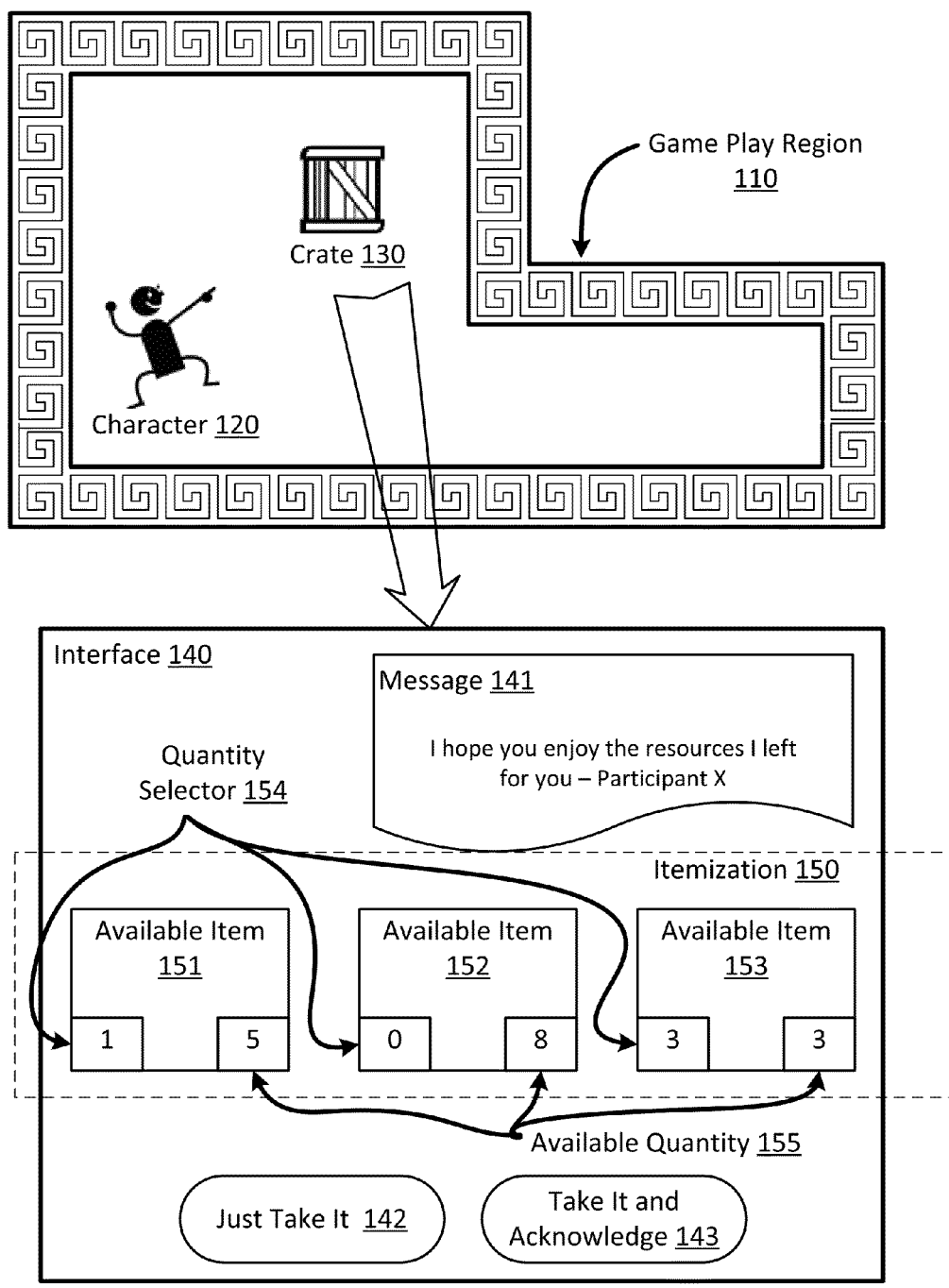
FIG. 1 shows a first exemplary gaming application display output.

FIG. 1 shows a first exemplary gaming application display output 100. This display output 100 may indicate a game play region 110 defining a space within which a participant's character 120 may navigate and explore. In this example, the item sharing object is shown as a crate 130. If the item sharing object 130 has been activated, such as by being clicked on by the participant or approached by the participant's character 120, and the item sharing object 130 includes at least one available item left behind by a prior participant, an interface 140 may be displayed that may include: a message 141 left by the prior participant, an itemization 150 of available items left by a prior participant, and an option to take selected quantities of the available items either without sending an acknowledgement 142 to the prior participant leaving the items or with sending the acknowledgement 143. If the option to send the acknowledgement 143 is chosen, the acknowledgement, which may, but need not be, customizable, may be transmitted to at least one other participant. The acknowledgement may, for example, be transmitted to the prior participant leaving the items, and it may include a reward for the prior participant. The itemization may include an identifier of each available item 151 to 153, a quantity selector 154 to select a quantity of available items to take, and an available quantity 155 of each available item.

Figure 2:
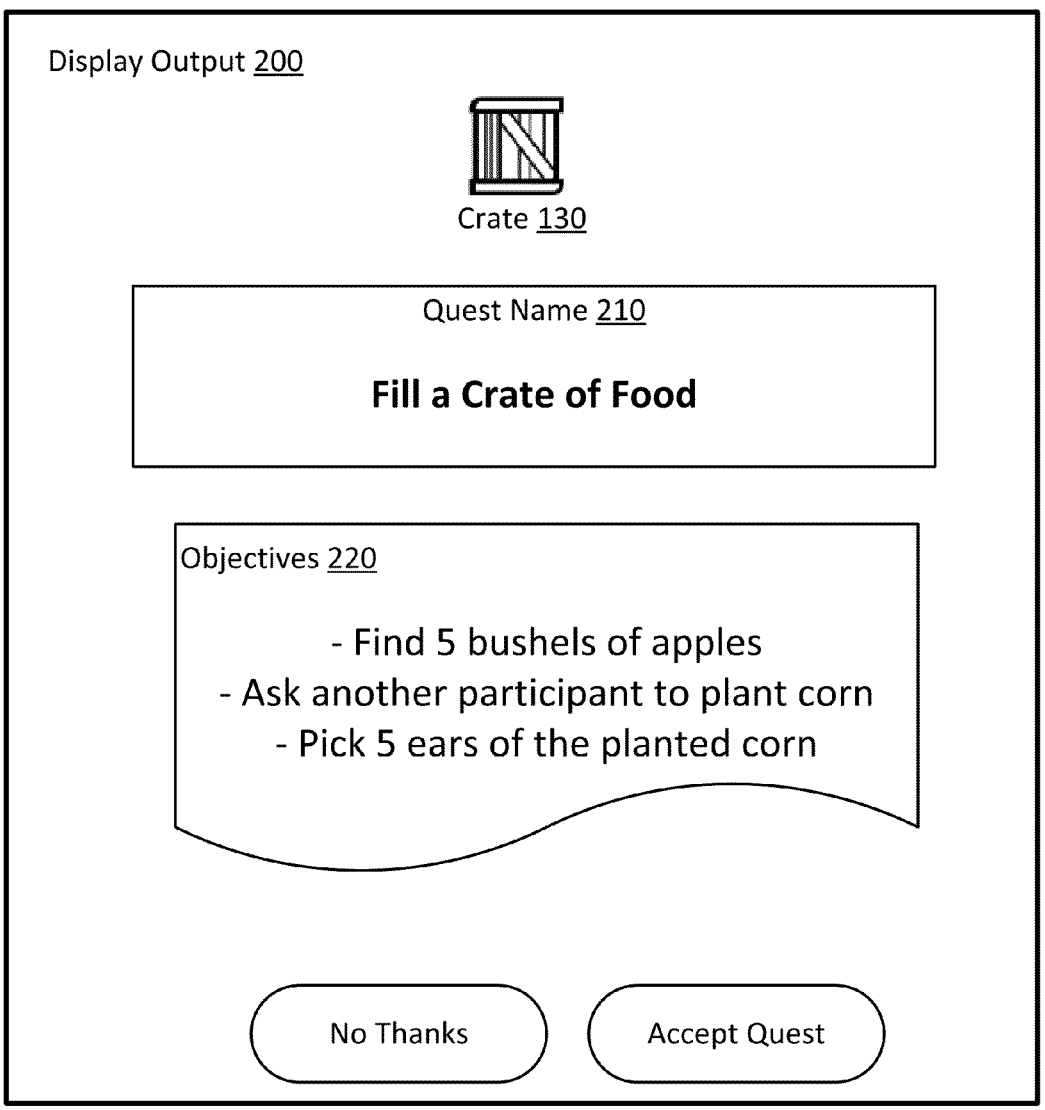
FIG. 2 shows a second exemplary gaming application display output.

FIG. 2 shows a second exemplary gaming application display output 200. This display output 200 may be displayed if the participant activates the item sharing object 130 and the item sharing object 130 is empty, in that it does not include any available items left behind by other participants. In this case, the participant activating the item sharing object 130 may be presented with an option to undertake a quest 210 to fill the item sharing object 130. In this case the quest may be to fill the crate 130 with food. The quest may include one or more objectives 220 required to complete the quest and, in this example, fill the crate 130 with food.

In some instances, only one participant may be permitted to engage in a quest at a time. Thus, if a prior participant is still engaged in a quest from an item sharing object, then a subsequent participant activating the same item sharing object may be prevent from engaging in the quest. In some instances, the current participant may be presented with the quest or otherwise permitted to engage in the quest once the prior participant has either ended the quest or has not completed the quest within a predetermined period.

The objectives 220 may include gathering resources, completing tasks, interacting with other participants, asking other participant to perform a task, or working with other participants to accomplish a goal. This may require the participant to interact with and/or send messages to other participants. For example, in this example, the objectives 220 require the participant to find five bushels of apples and ask another participant to plant corn, from which the participant is to gather five ears of corn, though in other embodiments, different objectives 220 may be specified. For instance, a quest objective may involve requesting another participant to leave behind an item for a subsequent participant.

Once the objectives 220 are complete, the items, in this case the five bushels of apple and five ears of corn, may be removed from the participant's possession and associated with the item sharing object so that they can be shared with another participant who later activates the item sharing object. The participant completing the quest 120 may also be given an option to leave a message 141 that may be sent to another participant who later activates the item sharing object and/or selects the item left behind.

In some instances, a participant attempting to activate the item sharing object may be required to first possess a predetermined item to activate the item sharing object. For example, if the item sharing object is a crate, a participant may first be required to possess a crowbar or other tool for opening the crate before the item sharing object may be activated. This may be done to maintain a particular sequence of events so that certain logical inconsistencies in the gaming application may be avoided.

In some instances once a first participant possessing the required item successfully activates the item sharing object, future participants need not possess the required item to activate the item sharing object. In other instances, at least some participants attempting to activate the item sharing object must possess the required item to activate the item sharing object.

Other restrictions may also be implemented in various gaming applications. For example, in some instances, participants may only be able to leave behind a specific item or items that are predetermined by the gaming application. In some of these instances, the gaming application may prompt the participant to select at least one item to leave behind from a group of predetermined items that may be left behind by the participant.

In addition, or, as an alternative, participants may only be able to leave certain quantities of an item behind for another participant. For example, the gaming application may require the participant to leave no less than a minimum quantity, no more than a maximum quantity, or an in between quantity of one or more items behind. In some instances, the participant may be prompted to select a quantity of at least one item to leave behind from a range of predetermined item quantities specified by the gaming application.

The item sharing object may also include a capacity representing a total quantity of items that participants may leave behind. For example, the item sharing object may only have a capacity of two items. If prior participant have already left behind the two items at the item sharing object, then a subsequent participant attempting to leave yet another item may be required to first remove, use, or take one of the previously left behind items by the prior participants before the subsequent participant can leave the other item behind. Thus, in some embodiments, a capacity of item sharing object may be checked before a participant is permitted to leave an item behind, and when the capacity of the item sharing object has been reached, the participant may be required to first take possession of a left behind item before the participant is permitted to leave another item behind.

Additional procedures may be used to prevent the creation of duplicate items from a single item intended to the be shared with another participant through the item sharing object. Duplicate items may be created from a single item associated with the item sharing object if, for example, an item left behind by another participant to share is not designated as unavailable once a first participant decides to use or take possession of the item, so that multiple participants may be able to possess or use the same item at the same time.

To prevent this from occurring, a participant activating the item sharing object may be provided with an opportunity to select an available item left behind by another participant. If the participant selects the item left behind, the item may be designated as possessed by the participant activating the item sharing object and no longer available to share with other participants through the item sharing object.

In addition to being provided with an opportunity to select an available item, a participant activating the item sharing object may also be presented with an opportunity to select a quantity of an item left behind that the participant would like to use. Once the participant selects a quantity of a particular item, such as a subset of a total available quantity of the particular item, the participant may be assigned possession of the selected quantity and the selected quantity may be designated as no longer available to share with another participant through the item sharing object.

Similarly, if a participant activating the item sharing object decides to leave an item or portion thereof behind to share with another participant, the item or portion thereof being left behind may be removed from an inventory or possession of the participant leaving the item and designated as available to share through the item sharing object. Each of these procedures may ensure that at most only one participant at a time may possess an item shared through the item sharing object.

The gaming application may also be configured to replace certain items left behind with other items that may be more useful to a subsequent participant activating the item sharing object. For example, if a prior participant leaves behind a set of coins after activating an item sharing object and a later participant activating the item sharing object is already carrying a maximum number of coins but has a minimal quantity of health, the set of coins may not offer any additional benefit to the later participant. The gaming application may then replace the set of coins with a quantity of extra health having a value equivalent to that of the set of coins left behind by the prior participant, and present the quantity of extra health to the subsequent participant. The gaming application may use formulas, lookup tables, or other stored information to calculate equivalent quantity values of replaced items.

Timing information may also be used in different embodiments to ensure that certain actions occur within a predetermined timeframe. For example, timing information may be used in some embodiments to require items left behind by participants to be used, picked up, or otherwise taken by other participants within a predetermined period, or else the items left behind may no longer be sharable with other participants so that, for example, it may appear to subsequent participants activating the item sharing object that no items have been left behind by other participants. Alternatively, timing information may be used to require the item sharing object to be activated by another participant within a predetermined period after an item has been left behind by the prior participant, otherwise the left behind item may be designated as not available so that, for example, it may appear to subsequent participants activating the item sharing object that no items have been left behind by other participants.

Figure 3:
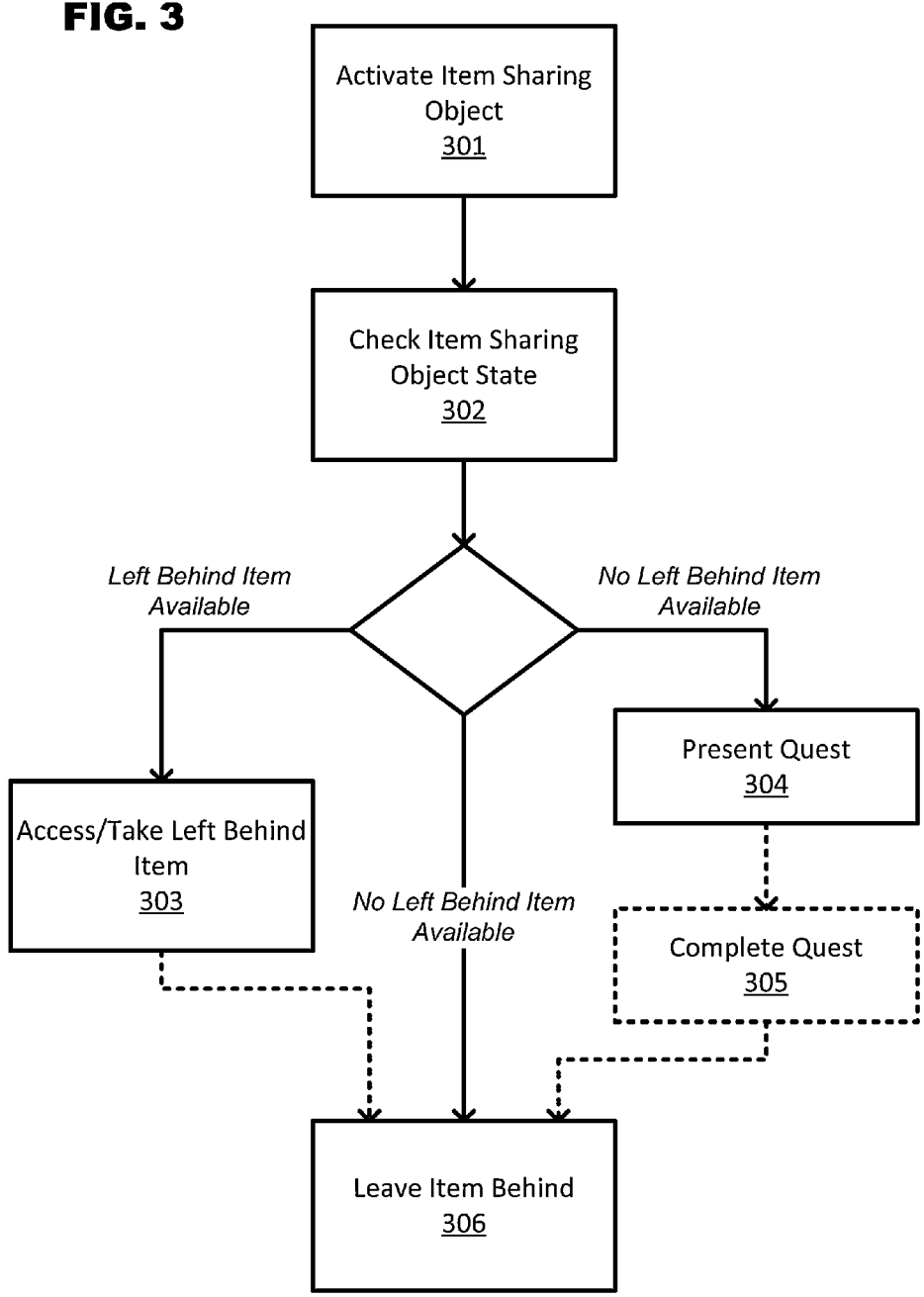
FIG. 3 shows an exemplary process in an embodiment.

FIG. 3 shows an exemplary process in an embodiment. In box 301, a participant in the multi-participant gaming application may activate an item sharing object 301. The object may be activated as discussed previously, such as by navigating a participant's character to a specific location, interacting with an object, or performing another designated action.

Once the item sharing object has been activated, in box 302, a state of the item sharing object and/or the items associated with the item sharing object may be checked. A checking of a state of the item sharing object may involve checking the state of the item sharing object itself, checking a state of an item associated with the item sharing object, and/or both checking the state of the item sharing object and an item associated with the item sharing object.

If the check indicates that an item left behind by a prior participant is available, in box 303 the gaming application may enable the current participant activating the item sharing object in box 301 to access and/or take the available left behind item. In some instances, the gaming application may also enable the participant to leave an item behind in box 306 for a subsequent participant who activates the item sharing object. In other instances, the gaming application may not do so.

If the check indicates that no items have been left behind and/or that no left behind items are available, then in box 304, the gaming application may present the participant activating the item sharing object in box 301 with a quest to leave behind an item for a subsequent participant activating the item sharing object. In box 306, the gaming application may enable the current participant activating the item sharing object in box 301 to leave behind an item for a subsequent participant activating the item sharing object.

In some instances, the enabling of a participant to leave behind an item in box 306 may be done either in addition to or as an alternative to presenting the participant with the quest in box 304, if the check in box 302 indicates that no items have been left behind and/or that no left behind items are available. In other instances, the enabling of a participant to leave behind an item in box 306 may only occur after the participant has completed the quest in box 305 that was presented in box 304. The participant present with the quest in box 304 need not be enabled to leave behind an item in box 306 in every embodiment.

Figure 4:
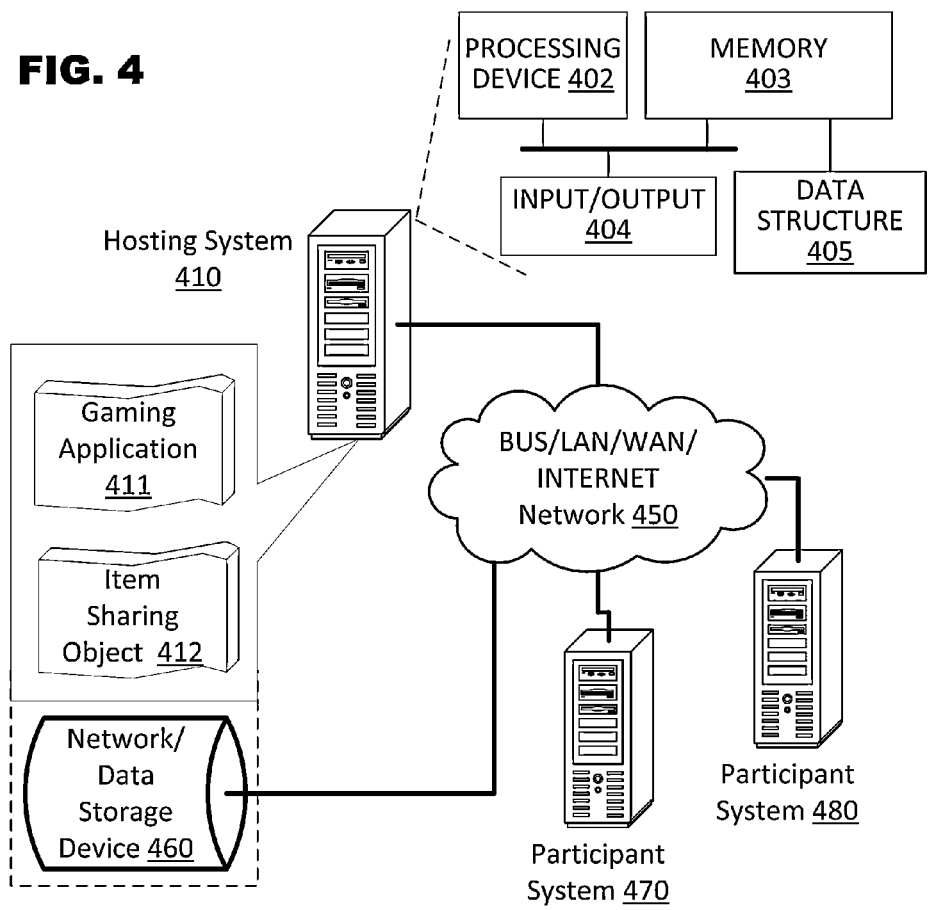
FIG. 4 shows an exemplary architecture in an embodiment.

FIG. 4 shows an exemplary architecture in an embodiment of the invention. A central or cloud based hosting system 410 may be used to host a backend component of a gaming application 411 including at least one item sharing object 412 that may be stored with other data of the gaming application in a network or data storage device 460. In other embodiments not shown, the gaming application 411 and item sharing objects 412 may be hosted entirely on one or more participant systems or on another third party system. Hosting system 410 may be connected to a network 450. Network 450 may include a LAN, WAN, bus, or the Internet. Hosting system 410 may interface with other systems and component depending on the application. For example, as discussed previously, a network/data storage device 460 may be used to store data associated with the gaming application 411, including item sharing objects 412. The storage device 460 may be a part of the hosting system 410. In some embodiments the network storage device 460 may also be separate from the hosting system 410 but connected to it through network 450. The storage device 460 may contain a hard disk drive, flash memory, or other computer readable media capable of storing data. Other external systems and data sources, such as participant systems 570 and 580 may also be connected to network 550. These participant systems 570 and 580 may be used by the participants in the multi-participant gaming application 411 to access and participant in the gaming application 411.

Each of the systems, clients, and devices in FIG. 4 may contain a processing device 402, memory 403 storing loaded data or a loaded data structure 405, and an communications device 404, all of which may be interconnected via a system bus. In various embodiments, each of the systems 410, 460, 470, and 480 may have an architecture with modular hardware and/or software systems that include additional and/or different systems communicating through one or more networks.

Communications device 404 may enable connectivity between the processing devices 402 in each of the systems (e.g., systems 410, 470, and 480) and the network 450 by encoding data to be sent from the processing device 402 to another system over the network 450 and decoding data received from another system over the network 450 for the processing device 502.

In an embodiment, memory 403 may contain different components for retrieving, presenting, changing, and saving data. Memory 403 may include a variety of memory devices, for example, Dynamic Random Access Memory (DRAM), Static RAM (SRAM), flash memory, cache memory, and other memory devices. Additionally, for example, memory 403 and processing device(s) 402 may be distributed across several different computers that collectively comprise a system.

Processing device 402 may perform computation and control functions of a system and comprises a suitable central processing unit (CPU). Processing device 402 may include a single integrated circuit, such as a microprocessing device, or may include any suitable number of integrated circuit devices and/or circuit boards working in cooperation to accomplish the functions of a processing device. Processing device 402 may execute computer programs, such as object-oriented computer programs, within memory 403.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the architecture shown in FIG. 4 shows two participant systems 470 and 480 connected to a hosting system 410 through an network 450, but in other embodiments a different number of participants using a different number of participant system may connect to the computing systems of other participants and/or a hosting system 410 to participate in the multi-participant gaming application.

We claim:

1. A method for item sharing in a multi-participant gaming application comprising:
    associating an item sharing object in the multi-participant gaming application with a predetermined quest involving a task to be completed by at least one participant using a processing device, the item sharing object functioning as a container storing an item after completing the task in the predetermined quest;
    responsive to an activation of the item sharing object in the multi-participant gaming application by a current participant, checking by the processing device whether the item sharing object is associated with an identifier of an item left behind by a previous participant resulting from a completion of the task in the predetermined quest by the previous participant;
    if the item sharing object is associated with the identifier, presenting the item left behind to the current participant with an identifier of the prior participant and a stored message previously entered by the prior participant; providing an opportunity for the current participant to acknowledge the identified prior participant as part of a taking of the item left behind by the prior participant and responsive to the current participant acknowledging the identified prior participant, transmitting the acknowledgement to at least one participant; and otherwise, presenting the current participant with the predetermined quest to complete the task and after completion leaving behind the item with a message from the current participant for a subsequent participant activating the item sharing object by the processing device.

2. The method of claim 1, wherein the quest includes at least one social task requiring an interaction between a plurality of participants in the multi-participant gaming application.

3. The method of claim 2, wherein the interaction involves sending a message between the plurality of participants requesting that a specified action be taken by at least one of the participants.

4. The method of claim 1, further comprising designating the item left behind by the prior participant as not available when the item sharing object has not been activated within a predetermined period.

5. The method of claim 1, wherein the quest involves requesting another participant to leave behind the item for the subsequent participant.

6. The method of claim 1, further comprising, preventing the current participant from engaging in the quest while the prior participant is engaged in a prior quest involving the item sharing object.

7. The method of claim 6, further comprising designating the prior participant as not engaged in the prior quest when the prior participant has not completed the prior quest within a predetermined period.

8. The method of claim 6, wherein the acknowledgement is transmitted to the prior participant and the acknowledgement includes a reward for the prior participant.

9. A method for item sharing in a multi-participant gaming application comprising:

associating an item sharing object in the multi-participant gaming application with a predetermined quest involving a task to be completed by at least one participant using a processing device, the item sharing object functioning as a container storing an item upon completion the task in the predetermined quest;

activating the item sharing object in the multi-participant gaming application using the processing device, the activating occurring through an action taken by a first participant;

identifying using the processing device whether an identifier of an item left behind by a second participant resulting from a completion of the task in the predetermined quest by the second participant is associated with the item sharing object;

if the identifier is associated with the item sharing object, enabling, through the processing device, the first participant to access the item left behind by the second participant in the multi-participant gaming application; providing an opportunity for the current participant to acknowledge the identified prior participant as part of a taking of the item left behind by the prior participant and responsive to the current participant acknowledging the identified prior participant, transmitting the acknowledgement to at least one participant; and otherwise, presenting the first participant with:

a first option, enabling, through the processing device, the first participant to leave a possessed item behind to share with another participant, wherein an identifier of the item left behind by the first participant is associated with the item sharing object, and a second option, enabling, through the processing device, the first participant to start the predetermined quest to complete the task and after completion leave behind the item with a message for a subsequent participant activating the item sharing object.

10. The method of claim 9, further comprising:

checking a capacity of the activated item sharing object to store items left behind to share; and when the capacity is reached, requiring the first participant to first take possession of a left behind item stored in the activated item sharing object before enabling the first participant to leave the possessed item behind.

11. The method of claim 9, wherein the action taken by the first participant to activate the item sharing object includes a navigating to a predetermined location in the multi-participant gaming application.

12. The method of claim 11, wherein the predetermined location varies for each gaming participant and for each instance of the gaming application.

13. The method of claim 9, wherein the action taken by the first participant to activate the item sharing object includes a revealing of the item sharing object.

14. The method of claim 9, wherein the item sharing object is a crate that appears on a display output when the item sharing object is activated and a representation of the available item left behind by the second participant also appears on the display output after access to the available item left behind by the second participant is enabled.

15. The method of claim 9, wherein the enabling the first participant to access the item left behind by the second participant includes providing the first participant with an opportunity to select the item left behind by the second participant, and responsive to the first participant selecting the item left behind by the second participant, designating the item left behind by the second participant as possessed by the first participant and no longer available to share through the item sharing object.

16. The method of claim 9, further comprising, responsive to the second participant leaving behind the item to share, removing the item left behind by the second participant from an inventory of the second participant and designating the item left behind by the second participant as available to share through the item sharing object.

17. The method of claim 9, further comprising, responsive to the first participant selecting the item left behind by the second participant, assigning possession of the item left behind by the second participant to the first participant, wherein the item left behind by the second participant is no longer available to share through the item sharing object.

18. The method of claim 17, wherein responsive to the first participant selecting a subset of a total available quantity of the item left behind by the second participant, assigning possession of the selected subset of the item left behind by the second participant to the first participant and designating the selected subset of the item left behind by the second participant as no longer available to share.

19. The method of claim 9, further comprising, responsive to the first participant leaving a possessed item behind to share with the other participant, prompting the first participant to provide a message to be sent to the other participant selecting the item left behind.

20. The method of claim 9, further comprising replacing a first quantity of the item left behind by the second participant with a second quantity of another item identified by the gaming application, the second quantity selected by the gaming application to represent an equivalent value to that of the first quantity of the item left behind by the second participant, wherein the first participant is enabled access to the second quantity of the other item.

21. The method of claim 9, wherein an initial participant attempting to activate the item sharing object must possess a predetermined item to activate the item sharing object.

22. The method of claim 9, wherein the first participant must possess a predetermined item to activate the item sharing object.

23. The method of claim 9, wherein the enabling the first participant to leave a possessed item behind to share with the other participant includes prompting the first participant to select at least one possessed item to leave behind from a group of predetermined items specified by the gaming application.

24. The method of claim 23, wherein the prompting the first participant to select at least one possessed item to leave behind also includes prompting the first participant to select an item quantity to leave behind from a range of predetermined item quantities specified by the gaming application.

25. A device comprising a computer readable medium including instructions that, when executed by a processing device, cause the processing device to:
associate an item sharing object in the multi-participant gaming application with a predetermined quest involving a task to be completed by at least one participant, the item sharing object functioning as a container storing an item after completing the task in the predetermined quest;
activate the item sharing object in the multi-participant gaming application, the activating occurring through an action taken by a first participant;
identify whether an identifier of an item left behind by a second participant resulting from a completion of the task in the predetermined quest by the second participant is associated with the item sharing object;
if the identifier is associated with the item sharing object, enable the first participant to access the item left behind by the second participant in the multi-participant gaming application; providing an opportunity for the current participant to acknowledge the identified prior participant as part of a taking of the item left behind by the prior participant and responsive to the current participant acknowledging the identified prior participant, transmitting the acknowledgement to at least one participant; and
otherwise, present the first participant with:
a first option, enabling the first participant to leave a possessed item behind to share with another participant, wherein an identifier of the item left behind by the first participant is associated with the item sharing object, and
a second option enabling the first participant to start the predetermined quest to complete the task and after completion leave behind the item with a message for a subsequent participant activating the item sharing object.

26. A multi-participant gaming system comprising:
a processing device executing a multi-participant gaming application;
a network interface connecting the processing device to a communications network to which computing devices of a plurality of gaming participants are connected; wherein
the processing device associates an item sharing object in the multi-participant gaming application with a predetermined quest involving a task to be completed by at least one participant, the item sharing object functioning as a container storing an item after completing the task in the predetermined quest;
the processing device activates the item sharing object in the multi-participant gaming application, the activation occurring through an action taken by a first participant communicated to the processing device through the network interface from a computing device of the first participant;
the processing device identifies whether an identifier of an item left behind by a second participant resulting from a completion of the task in the predetermined quest by the second participant is associated with the item sharing object;
the processing device enables the first participant to access the item left behind by the second participant in the multi-participant gaming application when the identifier is associated with the item sharing object; the processing device provides an opportunity for the current participant to acknowledge the identified prior participant as part of a taking of the item left behind by the prior participant and responsive to the current participant acknowledging the identified prior participant, transmits the acknowledgement to at least one participant; and
the processing device generates at least two options selectable by the first participant, the first option enables the first participant to leave a possessed item behind to share with another participant, wherein an identifier of the item left behind by the first participant is associated with the item sharing object, and the second option enables the first participant to start the predetermined quest to complete the task and after completion leave behind the item with the message for a subsequent participant activating the item sharing object.

* * * * *